US008479275B1

(12) United States Patent
Naseh

(10) Patent No.: US 8,479,275 B1
(45) Date of Patent: Jul. 2, 2013

(54) SECURE HIGH-THROUGHPUT DATA-CENTER NETWORK EMPLOYING ROUTED FIREWALLS

(75) Inventor: Zeeshan Naseh, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 1194 days.

(21) Appl. No.: 11/345,186

(22) Filed: Feb. 1, 2006

(51) Int. Cl.
*H04L 29/06* (2006.01)

(52) U.S. Cl.
USPC .......................................... 726/11

(58) Field of Classification Search
USPC ..................................... 726/11–14
See application file for complete search history.

(56) References Cited

U.S. PATENT DOCUMENTS

| | | | |
|---|---|---|---|
| 6,563,800 B1 | 5/2003 | Salo et al. | |
| 6,614,781 B1 | 9/2003 | Elliott et al. | |
| 6,857,059 B2 | 2/2005 | Karpoff et al. | |
| 7,093,280 B2 * | 8/2006 | Ke et al. ............................. | 726/3 |
| 7,099,912 B2 * | 8/2006 | Ishizaki et al. ................. | 709/201 |
| 7,159,031 B1 * | 1/2007 | Larkin et al. ................... | 709/238 |
| 7,761,923 B2 * | 7/2010 | Khuti et al. ....................... | 726/27 |
| 2002/0133534 A1 * | 9/2002 | Forslow ......................... | 709/200 |
| 2004/0003284 A1 * | 1/2004 | Campbell et al. ............. | 713/201 |

OTHER PUBLICATIONS

Cisco IPsec VONSM vulnerable to Dos via malformed IKE packet, US DHS, 2004.*
Mauricio Arregoces and Maurizio Portolani, "Data Center Fundamentals", Cisco Press, 2004.*
"Data Center Infrastructure Architecture Overview", Cisco Press, Mar. 2004.*
"Cisco IPSec and SSL VPN Solutions", Cisco Press, 2004.*
"Cisco Catalyst 6500 Series Firewall Services Module for Cisco Catalyst 6500 Series and Cisco 7600 Series", Cisco Press, 2004.*
Cisco Catalyst 6500 Series and Cisco 7600 Series Network Analysis Module 1 and 2, Cisco Press, 2004.*
"A stateful intrusion detection system for World-Wide Web Servers", Vigna, G. Robertson, W., Vishal Kher, Kemmerer, R.A. Dec. 8, 2003.*
Cisco Systems, Inc., "Data Center Infrastructure Architecture Overview", Copyright © Mach 2004, 31 pages.
Cisco Systems, Inc., "Data Center Segmentation in the Business Ready Data Center Architecture", Copyright © 1992-2004, 9 pages.

* cited by examiner

*Primary Examiner* — Gilberto Barron, Jr.
*Assistant Examiner* — David Le
(74) *Attorney, Agent, or Firm* — Fish & Richardson P.C.

(57) ABSTRACT

A reliable and secure data-center. The data center includes a first data-center tier that is adapted to connect to an external network and an internal portion of the data center. A first firewall instance interfaces the first tier and the external network. A second firewall instance interfaces the first tier and the internal portion of the data center. In a more specific embodiment, the first firewall instance and the second firewall instance accommodate Internet Protocol SECurity (IPSEC) terminations using one or more VPNSMs. In this embodiment, the first data-center tier implements a core tier that includes one or more core switches that facilitate implementing the first firewall instance and the second firewall instance. The interior portion of the network represents a DeMilitarized Zone (DMZ) that includes a second tier that is connected between the first data-center tier and a third tier. The second tier implements an aggregation tier that includes one or more aggregation switches that facilitate implementing reverse-proxy caching. Overall Layer-3 design methodology is used within each tier and across tiers for optimized packet switching. The aggregation tier includes one or more aggregation-tier service modules for implementing load balancing, Secure Socket Layer (SSL) offloading, and/or the reverse-proxy caching.

42 Claims, 2 Drawing Sheets

SECURE HIGH-THROUGHPUT DATA-CENTER NETWORK EMPLOYING ROUTED FIREWALLS

BACKGROUND OF THE INVENTION

This application is related to co-pending U.S. patent application Ser. No. 11/227,377 entitled "Data-Center Network Architecture", filed on Sep. 14, 2005, which is hereby incorporated by reference as if set forth in full in this application for all purposes.

This invention is related in general to networks and more specifically relates to data-center network architecture.

Data-center networks, called data centers, are employed in various demanding applications, including business, government, university networks. Such applications often demand readily available, reliable, and secure data centers for hosting critical applications and data storage facilities, such as servers and databases.

Highly available, redundant, and scalable data centers are particularly important in enterprise applications, where rapid network growth and network attacks are common. Unfortunately, existing data-center network designs often require tradeoffs between security capabilities, bandwidth, and scalability. Consequently, conventional data centers must often trade network security for reduced network bandwidth and availability, resulting in networks that are undesirably vulnerable to traffic bottlenecks.

DETAILED DESCRIPTION OF EMBODIMENTS OF THE INVENTION

A preferred embodiment of the present invention implements a data-center network. In a specific embodiment, the data center includes a first data-center tier that that connects to an external network and to an internal portion of the data center. A first firewall instance interfaces the first tier and the external network. A second firewall instance interfaces the first tier and the internal portion of the data center. The data center reliably incorporates essential data center components in a secure, scalable, and redundant fashion.

For clarity, various well-known components, such as power supplies, modems, network blades, Service Providers (ISPs), browsers, standby modules, and so on, have been omitted from the figures. However, those skilled in the art with access to the present teachings will know which components to implement and how to implement them to meet the needs of a given application.

Figure 1:
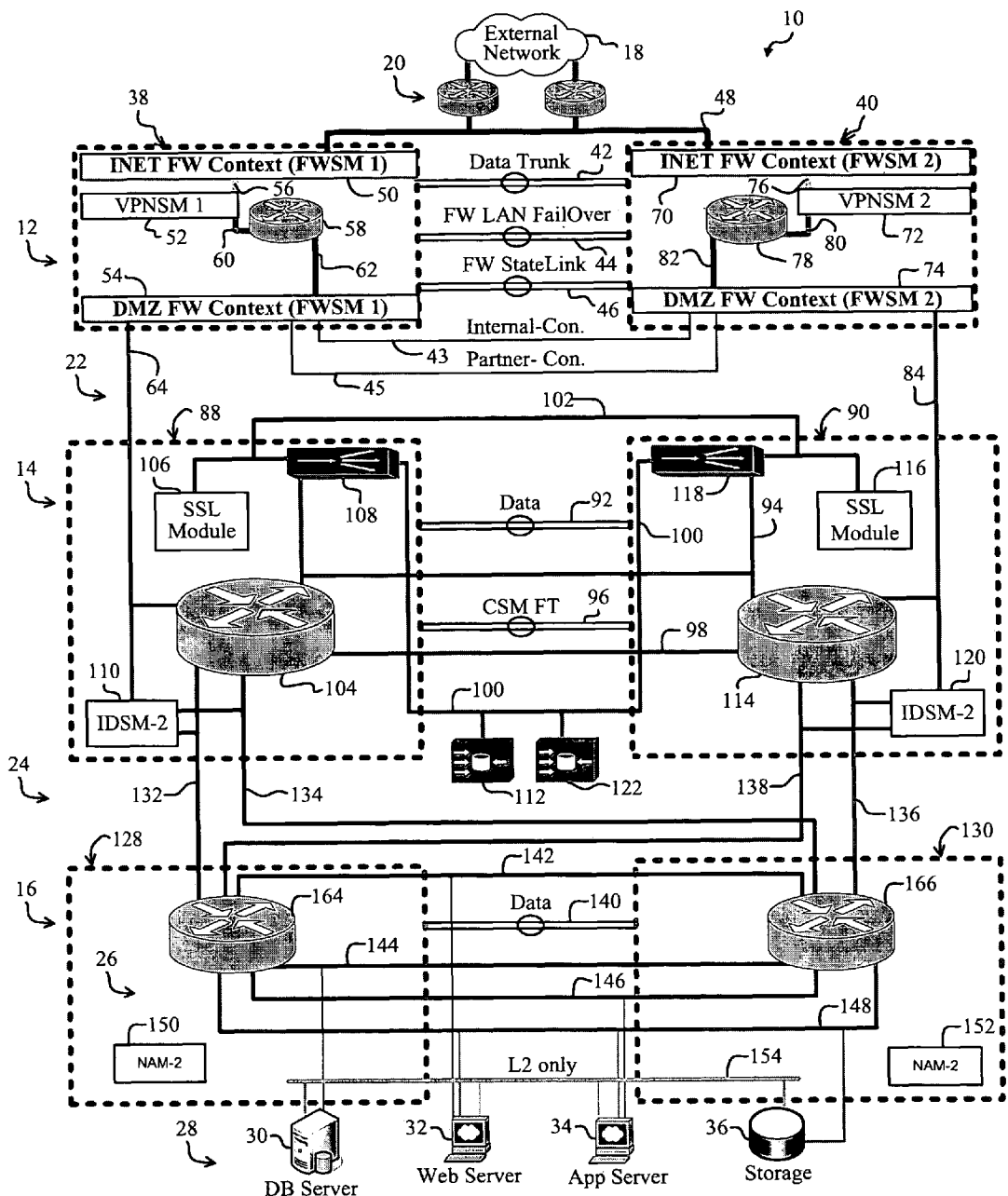
FIG. 1 is a diagram of a data center illustrating key logical components according to an embodiment of the present invention.

FIG. 1 is a diagram of a data-center network, i.e., a data center 10, illustrating key logical components according to an embodiment of the present invention. The data center 10 includes a core tier 12, an aggregation tier 14, and an access tier 16. The core tier 12 is also called the front-end of the data center 10. The aggregation tier 14 is also called a distribution tier or a services tier. The access tier 16 is also called the server tier of the data center 10. Data-center tiers are often called-data center layers, however, the term tier is employed herein to avoid confusion with other types of network layers.

A 'tier' or 'level' can include a group of any number and type of devices, processes or other components. The grouping can be functional, logical, physical, network-based, or defined according to some other criterion. For example, devices within a range of IP addresses can form a 'tier'. More commonly, components performing a standard data center function (whether directly or ancillary) can be considered to be in a given 'tier.' A component may be in more than one tier.

Specific types of tiers such as "core," "aggregation" and "access" tiers have different types of general functionality. In a preferred embodiment the core tier acts as a data-center front-end tier that may facilitate interfacing an internal tier or layer of a data center with an external network. The aggregation tier facilitates interfacing the core tier with an access tier. The access tier facilitates communications between servers and selectively enables other networks and devices to access the servers via the aggregation tier and the core tier. However, in other embodiments the functionality of a specific tier may be modified without departing from the scope of the invention. Further, a data center or similar system may use additional tiers, and/or may omit or replace one of the three tiers and remain within the scope of the invention.

The core tier 12 connects to an external network 18 via a pair of edge routers 20. The core tier 12 connects to the aggregation tier 14 via one or many Level-3 (L3) interface 22. The aggregation tier 14 connects to the access tier 16 via one or many L3 interface 24. The access tier 16 connects to server devices 28 via one or many L3 interface 26. For illustrative purposes, the server devices 28 are shown including a database server 30, a web server 32, and a network storage facility 36. The network storage facility 36 is also called a Network-Attached Storage (NAS) device. The server devices 28 are also called appliances.

For the purposes of the present discussion, a data center may be any network that is adapted to host one or more servers, applications, network storage facilities (memories), and/or other appliances. A data-center tier may be a section of or a layer in a data center that includes one or more switches that are positioned between opposite ends of a data center. The opposite ends of a data center include one end of the data center that is adapted to connect to an external network, such as the Internet and/or partner extranets, and another end of the data center that includes or that is connected to application servers, network storage facilities, and/or database servers. Tiers of a data center may be defined physically and/or logically as discussed more fully below.

A data center tier, such as the aggregation tier 14, may be a layer of network switches and routers that is used to aggregate the layers below. The servers 28 are aggregated or connected to the access tier 16; the access tier switches and routers connect up to the aggregation tier 14; the core tier 12 connects to the aggregation tier 14 and the access tier 16. This approach helps in designing a scalable data center.

A Layer-3 (L3) interface may be an interface that is adapted to transfer information in accordance with Layer 3 of the OSI standard. Similarly, an L3 switch may be a switch that performs various L3 switching or routing functions. A Layer-2 (L2) interface may be an interface that is adapted to transfer information in accordance with Layer 2 of the International Organization for Standardization (ISO) Open Systems Interconnect (OSI) standard. Similarly, an L2 switch may be a switch that performs various L2 switching functions in accordance with the OSI standard. For example, an L2 switch or interface may facilitate switching or transferring packets based on physical protocols employing Media Access Control (MAC) addresses, while an L3 switch or interface may switch or transfer information packets based logical or routing protocols employing Transmission Control Protocol/Internet Protocol (TCP/IP) addresses. A multilayer switch may perform various functions associated with multiple layers of the OSI standard. A router performs various L3 functions, and consequently, is often considered to be a type of L3 switch.

A switch may be any device, module, software instruction, or other entity that can receive information and forward the information in a predetermined way, such as to a predetermined device address. Examples of switches include L2 switches, L3 switches, and routers.

In the present specific embodiment, the core tier 12 includes a pair of core switches including a first core-tier switch 38 and a second core-tier switch 40, which are interconnected via a core-tier data-trunk PortChannel 42, a FireWall (FW) Local Area Network (LAN) FailOver PortChannel 44, a FW StateLink PortChannel 46, an edge VLAN 48, an internal-connectivity VLAN 43, and a partner-connectivity VLAN 45.

Use of separate PortChannels for data 42 and control 44, 46 traffic may prevent undesirable split-brain problems arising from applications running on the core-tier switches 38, 40. For the purposes of the present discussion a split-brain problem occurs when two instances of a given program or module undesirably interfere with each other. For example, two instances of a given program may attempt to simultaneously access similar resources or behave in similar ways in situations wherein only one instance of the program or module can access the resources or behave in a given way without creating split-brain problems.

A PortChannel may be an aggregation of multiple physical interfaces into one logical interface to provide higher aggregated bandwidth, load balancing, and link redundancy. PortChannels may connect to interfaces across switching modules so that a failure of a switching module will not bring down the PortChannel link.

The core switches 38, 40 incorporate various instances of service-module intelligence, including a first Internal Network (INET) virtual firewall instance 50, a first Virtual Private Network Service Module (VPNSM) 52, and a first DeMilitarized Zone (DMZ) virtual firewall instance 54. For the purposes of the present discussion, service modules may be hardware or software entities, such as appliances and software modules. Service-module intelligence may represent any functionality that is implemented via service modules, such as firewall, content-switching, Secure Socket Layer (SSL), Virtual Private Network, Guard XT, and anomaly detector modules.

In the present specific embodiment, the first virtual firewall instance 50 is implemented via firewall service-module routines running on the first core-switch 38. The firewall service-module routines 50 employ functionality provided by the first VPN service module 52 via a first internal VLAN 56. The first VPNSM 52 communicates with a first core-tier switch-core 58 via a second internal VLAN 60. The first DMZ virtual firewall instance 54 is also implemented via firewall service-module routines running on the first core-tier switch core 38, which employ functionality provided the first VPNSM 52 via a third internal VLAN 62, the core-tier switch core 58, and the second internal VLAN 60.

The first core-tier switch 38 is interfaced with the external network 18 via the first INET virtual firewall instance 50, the edge routers 20 and the edge VLAN 48. The edge VLAN 48 and the edge routers 20 may be considered as part of the external network 18 without departing from the scope of the present invention.

The first core-tier switch 38 is interfaced with the aggregation tier 14 via a first aggregation-to-core VLAN 64, which is part of the first L3 interface 22. Similarly, the internal-connectivity VLAN 43 and the partner-connectivity VLAN 45 connect to the first core-tier switch 38 through the first DMZ virtual firewall instance.

In the present specific embodiment, the second core-tier switch 40 is similar to the first core-tier switch 38. For example, the second core-tier switch 40 includes a second INET virtual firewall instance 70, a second VPNSM 72, a second DMZ virtual firewall instance 74, fourth internal VLAN 76, a second core-tier switch core 78, a fifth VLAN 80, and a sixth VLAN 82, which correspond to the first core-tier service module components 50-62, respectively. The second DMZ virtual firewall instance 74 connects to the aggregation-tier 14 via a second aggregation-to-core VLAN 84, which is similar to the first aggregation-to-core VLAN 64.

In operation, with reference to the core tier 12, traffic from the external network 18 to the data center 10 is cleaned by the INET virtual firewall instances 50, 70, and the DMZ virtual firewall instances 54, 74. Similarly, traffic from the aggregation tier 14 and access tier 16 to the core tier 12 may be cleaned by the DMZ virtual firewall instances 54, 74. Traffic from the connectivity VLANs 43, 45 to the core-tier switches 38, 40 is also cleaned by the DMZ virtual firewall instances 54, 74.

For the purposes of the present discussion, data-center components that are protected by one or more firewall instances, such as the firewall instances 50, 70, 54, 74 are considered to be in a DeMilitarized Zone (DMZ). Hence, the internal portion of the data center 10 resides in a DMZ. Furthermore, the internal components and modules of the core-tier switches 38, 40 are in a DMZ. Similarly, the aggregation tier 14, access tier 16, appliances 28, and interfaces 22-26, which are present in the data center 10, are behind the first INET virtual firewall instances 50, 70, and second DMZ virtual firewall instances 54, 74, and consequently, are in a DMZ.

In the present specific embodiment, the virtual firewall instances 50, 70, 54, 74 are routed firewalls. For the purposes of the present discussion, a routed firewall may be a firewall that performs L3-switching or routing functions. A routed firewall instance may be a copy or running implementation of a firewall program that implements a routed firewall. For the purposes of the present discussion, the terms firewall, firewall instance, and firewall context are employed interchangeably.

A virtual instance of a firewall may be an instance that is implemented via or that is simulated by software and memory instead of via hardware or another physical form. A context may represent an environment or setting in which a given program, module, or instance thereof exists. The terms virtual firewall instance and virtual firewall context are sometimes employed interchangeably.

The first DMZ virtual routed firewall instance 54 performs routing functions, such as various L3 functions, in addition to data filtering and blocking. The routing functions facilitate routing data between the third internal core-tier VLAN 62 and the connectivity VLANs 43, 45 and the aggregation-to-core VLAN 64.

One skilled in the art may readily employ L3 switches or routers, such as Cisco Catalyst 6509 switching systems, to implement the core tier 12 without undue experimentation.

The aggregation tier 14 includes a first L3 aggregation-tier switch 88 and a second L3 aggregation-tier switch 90, which are interconnected via a data PortChannel 92, a Content Switching Module (CSM) VLAN 94, a CSM Fault Tolerant (FT) PortChannel 96, a common VLAN 98, a cache VLAN 100, and a Secure Socket Layer (SSL) VLAN 102.

The first L3 aggregation-tier switch 88 includes a first aggregation-tier switch core 104, a first SSL module 106, a first CSM Server Load Balancer (SLB) module 108, and a first Intrusion Detection Services Module (IDSM) 110. Similarly, the second L3 aggregation-tier switch 90 includes a second aggregation-tier switch core 114, a second SSL module 116, a second CSM SLB module 118, and a second IDSM 120.

The first aggregation-tier switch core 104 connects to the first DMZ routed virtual firewall instance 54 via the first aggregation-to-core VLAN 64, which is an L3 VLAN that is part of the first L3 interface 22. The first CSM SLB 108 communicates with the first aggregation-tier switch core 104 via the CSM VLAN 94, which also connects the second aggregation-tier switch core 114 with the second CSM SLB 118 and interconnects the first aggregation-tier switch cores 104, 114. The first CSM SLB 108 is connected to the second CSM SLB 118 via the cache VLAN 100, to which is also connected a first Content Engine (CE) 112 and a second CE 122, which employ cache memory. The CSM SLB modules 108, 118 and the SSL modules 106, 116 are interconnected via the SSL VLAN 102.

The CSM SLB modules 108, 118 are implemented via one-arm connections 94 to the aggregation-tier switch cores 104, 114. For the purposes of the present discussion, a first module 108, 118 or device is said to be connected to a second module or device 104, 114 if they are interconnected via a single interface. The CSM VLAN 94 represents a one-arm connection. Use of the one-arm connection facilitates directing only traffic that needs to be load balanced to the load balancers 108, 118.

One skilled in the art may readily employ L3 switches or routers, such as Cisco Catalyst 6513 switching systems, to implement the aggregation tier 14 without undue experimentation.

The first aggregation-tier switch core 104 is connected to a first access-tier switch 128 at a first access-tier switch core 164 and to a second access-tier switch 130 at a second access-tier switch core 166 via a first access-to-aggregation VLAN 132 and a second access-to-aggregation VLAN 134, respectively. Similarly, the second aggregation-tier switch core 114 is connected to the second access-tier switch 130 and the first access-tier switch 128 via a third access-to-aggregation VLAN 136 and a fourth access-to-aggregation VLAN 138, respectively.

The first IDSM module 110 of the first aggregation-tier switch 114 monitors the first aggregation-to-core VLAN 64, the first access-to-aggregation VLAN 132 and the second access-to-aggregation VLAN 134 for suspicious or potentially malicious traffic, such as traffic that resulting from worms, attempted Denial-Of-Service attacks, and so on. If suspicious data traffic is observed, one or more alarms may be forwarded to a user interface, such as a switch console and/or to one or more computers that are connected to one or more of the monitored VLANs 64, 132, 134. Similarly, the second IDSM module 120 monitors the second aggregation-to-core VLAN 84, the third access-tier VLAN 136, and the fourth access-to-aggregation VLAN 138. The access-to-aggregation VLANs 132-138 form the second L3 interface 124 and are implemented via multiple point-to-point links to minimize routing address convergence. Furthermore, the use of multiple point-to-point links ensures that failure of any given link will not disable the interface 24.

The IDSM modules 110 and 120, the CSM SLB modules 108, 118, and the SSL modules 106, 116 represent instances of service-module intelligence. Hence, unlike conventional data centers, the data center 10 includes service-module intelligence 50, 70, 54, 74, 106, 116, 108, 118, 110, 120 in both the core tier 12 and the aggregation tier 14.

The access-tier 16 includes the access-tier L3 switches 128, 130. The access-tier switches 128, 130 are interconnected via an access-tier data PortChannel 140, a Web VLAN 142, a database VLAN 144, an application VLAN 146, and a management VLAN 148. Various data PortChannels, including the access-tier data PortChannel 140, the aggregation-tier data PortChannel 92, and the core-tier data-trunk PortChannel 42 each may implement several VLANs. The access-tier switches 128, 130 provide the default gateway for the appliances 28.

The access-tier switches 128, 130 also include Network Analysis Modules (NAMs) 150, 152, respectively, which are adapted to analyze the operation of the switches 128, 130 and accompanying VLANs. NAMs are known in the art. However, conventionally, NAMs are not deployed in the data-center access tiers.

The NAMs 150, 152 represent instances of access-tier service-module intelligence. The virtual routed firewall instances 50, 70, 54, 74 represent instances of core-tier service-module intelligence. Similarly, the CSM SLBs 108, 118, SSL modules 106, 116, the IDSMs 110, 120, and the content engines 112, 122 represent aggregation-tier service-module intelligence.

The various server devices 28 are interconnected via a storage VLAN 154 implemented via the access layer 16. The third L3 interface 26 between the server devices 28 and the access-tier 16 is implemented via the Web VLAN 142, the database VLAN 144, the application VLAN 146, and the management VLAN 148. The database server 30 connects to the access-tier 16 via the database VLAN 144. Similarly, the Web server 32 connects to the access tier 16 via the Web VLAN 142; the application server 34 connects to the access tier 16 via the application VLAN 146; and the network storage facility 36 connects to the access tier 16 via the management VLAN 148.

One skilled in the art may readily employ L3 switches or routers, such as Cisco Catalyst 6509 switching systems, to implement the access tier 16 without undue experimentation.

Hence, the firewalls 50, 70, 54, 74 of the core-tier 12 may be integrated in to the VPNSMs 52, 72 to facilitate providing IPSEC functionality.

The firewalls 50, 70, 54, 74 employ the VPNSMs 52, 72 to provide IPSEC VLAN terminations.

The firewalls 50, 70, 54, 74 may be implemented via one or more blades that plug into slots in the switches 38, 40. Each firewall instance 50, 70, 54, 74 may operate independently of the other instances and may operate in accordance with different sets of rules, which may be defined by various access-control lists and other rule sets.

The core-tier switches 38, 40 provide security perimeters and VPN facilities for each associated VLAN 42-48, 64, 84. The aggregation-tier switches 88, 90 may provide layer 4-7 switching capabilities with additional SSL offload capabilities provided by the SSL modules 106, 116. The aggregation-tier switches 88, 90 may further implement reverse-proxy caching via the CEs 112, 122 in addition to intrusion detection via the IDSMs 110, 120. The NAMs 150, 152 in the access switches 128, 130 monitor server VLANs 142-148. Use of the L3 switches 128, 130 in the access tier 16 facilitates minimizing traffic bottlenecks that might otherwise be caused by L2 SLBs or firewalls.

Hence, data centers constructed in accordance with certain embodiments of the present invention may result in reduced traffic bottlenecks. Use of multiple firewall instances between the internal portion of the data center 10 and external networks, such as the external network 18 enhance security by providing double-perimeter security. Additional security is achieved via use of the isolated firewall state links 46 between the core-tier switches 38, 40.

Further security benefits are achieved by tying IPSEC tunnels, which are represented by the edge VLAN 48, to the virtual INET virtual firewall instances 50, 58 while simultaneously implementing SLB, SSL offloading, and reverse-proxy caching in the aggregation layer 14. This is achieved in part by placing the VPNSMs 52, 72 on the core pair of switches 38, 40, while placing the CSM SLBs 108, 118, SSL Service Modules (SSLSMs) 106, 116, CEs (caches) 112, 122, and the IDSMs 110, 120 on a different pair of switches, such as the access-tier pair of switches 88, 90.

While the present embodiment is discussed with reference to use of L2 and L3 switches and interfaces, certain multilayer switches and interfaces may be employed to implement embodiments of the present invention without departing from the scope thereof. The aggregation-tier switches 88, 90 may be implemented via Cisco Catalyst 6513 switches. The access-tier switches 128, 130 may be implemented via Cisco Catalyst 6509 switches.

Figure 2:
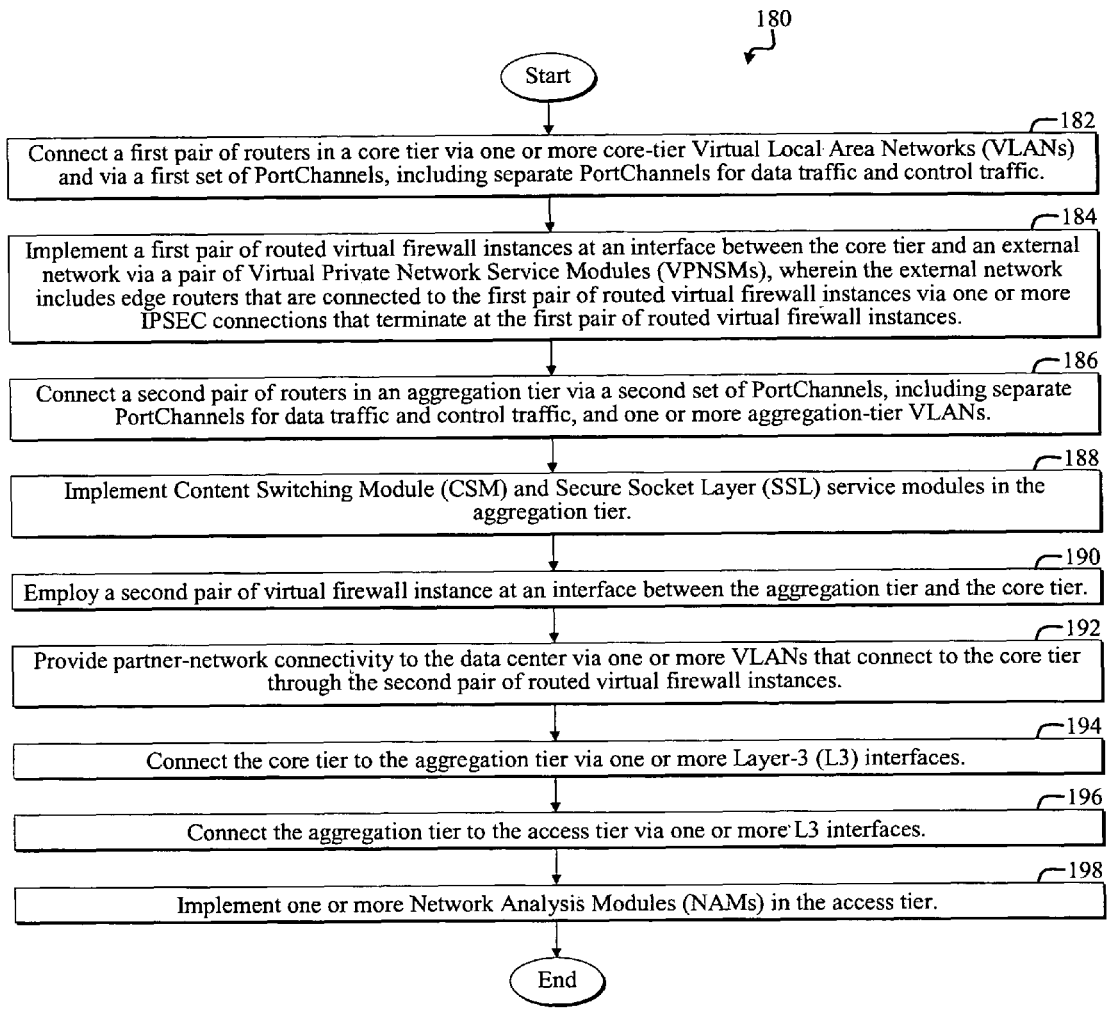
FIG. 2 is a flow diagram of a method adapted for use with the data centers of FIG. 1.

FIG. 2 is a flow diagram of a method 180 adapted for use with the data-center networks 10 of FIG. 1. The method 180 represents a method for implementing a data center. The method 180 includes a first step 182, which includes connecting a first pair of routers in a core tier via a first set of PortChannels, including separate PortChannels for data traffic and control traffic, and via one or more core-tier VLANs.

A second step 184 includes implementing a first pair of routed virtual firewall instances at an interface between the core tier and an external network via a pair of Virtual Private Network Service Modules (VPNSMs), wherein the external network includes edge routers that are connected to the first pair of routed virtual firewall instances via one or more IPSEC connections that terminate at the first pair of routed virtual firewall instances.

A third step 186 includes connecting a second pair of routers in an aggregation tier via a second set of PortChannels, including separate PortChannels for data traffic and control traffic, and one or more aggregation-tier VLANs.

A fourth step 188 includes implementing CSM and SSL service modules in the aggregation tier.

A fifth step 190 includes employing a second pair of virtual firewall instances at an interface between the aggregation tier and the core tier.

A sixth step 192 includes providing partner-network connectivity to the data center via one or more VLANs that connect to the core tier through the second pair of routed virtual firewall instances.

A seventh step 194 includes connecting the core tier to the aggregation tier via one or more Layer-3 (L3) interfaces An eighth step 196 includes connecting the aggregation tier to the access tier via one or more L3 interfaces A ninth step 198 includes implementing one or more Network Analysis Modules (NAMs) in the access tier.

While the present embodiment is discussed with reference to data center and accompanying network architectures, embodiments of the present invention are not limited thereto. For example, many types of networks, either wired or wireless, may benefit from data storage, security, and scalability efficiencies afforded by embodiments of the present invention. Employing novel methods, such as that involving incorporating service-module intelligence at both core switches and aggregation switches, may yield improvements in network resource management for many types of networks.

Variations and embodiments other than those discussed herein are possible. For example, embodiments employing additional or fewer types of network modules and different types of interconnections, such as wireless connections, are possible.

Although a process of the present invention may be presented as a single entity, such as software executing on a single machine, such software can readily be executed on multiple machines. Furthermore, multiple different modules and/or programs of embodiments of the present invention may be implemented on one or more machines without departing from the scope thereof.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A data center comprising:
    a first data-center tier configured to electronically connect to an external network;
    an internal portion of the data center coupled to the first data-center tier, wherein the internal portion comprises:
        a second data-center tier comprising:
            a second data-center tier internal core; and
            an intrusion detection service module; and
        a third data-center tier comprising a third data-center tier internal core;
    a first routed firewall instance coupled between the first data-center tier and the external network; and
    a second routed firewall instance coupled between the first data-center tier and the second data-center tier, wherein the second routed firewall instance facilitates data filtering and routing data between a plurality of virtual local area networks (VLANs) that are internal to the first data-center tier and a VLAN that interfaces the first data-center tier and the second data-center tier, and wherein the intrusion detection service module is electronically connected to the second routed firewall instance, the second data-center tier internal core, and the third data-center tier internal core.

2. The data center of claim 1, further comprising internet protocol security (IPSEC) terminations at the first and second routed firewall instances.

3. The data center of claim 1, further comprising a first data-center tier core included in the first data-center tier, the first data-center tier core tier further comprising one or more core switches that facilitate implementing the first routed firewall instance and the second routed firewall instance.

4. The data center of claim 1, wherein the internal portion further comprises a secure socket server module coupled to the second data-center tier internal core via a load balancer.

5. The data center of claim 1, further comprising an aggregation tier included in the second data-center tier, wherein the aggregation tier includes one or more aggregation switches that facilitate implementing reverse-proxy caching.

6. The data center of claim 5, further comprising one or more aggregation-tier service modules included in the aggregation tier, wherein the one or more aggregation-tier service modules implements a function selected from the group consisting of
   load balancing,
   secure socket layer (SSL) offloading, and
   reverse-proxy caching.

7. The data center of claim 1, further comprising a first pair of switches, a second pair of switches, and a third pair of switches, included in the first data-center tier, the second tier, and/or the third tier, respectively.

8. The data center of claim 7, wherein one or more port channels connect switches of the first pair of switches, the second pair of switches, and the third pair of switches.

9. The data center of claim 8, wherein the first pair of switches, the second pair of switches, and the third pair of switches include one or more layer-3 (L3) switches.

10. The data center of claim 8, further comprising plural port channels, the plural port channels including a first port channel for carrying data traffic and a second port channel for carrying control traffic.

11. The data center of claim 1, further comprising service-module intelligence implemented in the first data-center tier.

12. The data center of claim 11, further comprising one or more virtual private network service modules (VPNSMs) included in the service-module intelligence.

13. The data center of claim 12, wherein the first routed firewall instance and the second routed firewall instance are implemented via a first VPNSM.

14. The data center of claim 13, wherein the first VPNSM runs on a first switch.

15. The data center of claim 14, wherein the first VPN runs on a blade of the first switch, wherein the first switch is a router.

16. The data center of claim 13 further comprising a firewall state link port channel coupled between core-tier switches in the first data-center tier.

17. The data center of claim 11, wherein the first routed firewall instance and the second routed firewall instance, which include virtual routed firewall instances, are included in the service-module intelligence.

18. The data center of claim 17, wherein the virtual routed firewall instances are implemented via one or more firewall service modules (FWSMs) and one or more virtual private network service modules (VPNSMs).

19. The data center of claim 17, wherein the first virtual routed firewall instance interfaces the external network and the data center.

20. The data center of claim 19, wherein the second virtual routed firewall instance interfaces the first data-center tier with the second data center tier.

21. The data center of claim 19, further comprising internet-protocol security (IPSEC) VLAN terminations implemented via one or more VPNSMs, wherein the IPSEC VLAN terminations are included in the first routed firewall instance and the second routed firewall instance.

22. The data center of claim 1, further comprising aggregation-tier service-module intelligence implemented in the second data center tier.

23. The data center of claim 22, further comprising a content switching module (CSM), a secure socket layer service module (SSLSM), and an intrusion detection service module (IDSM), which are included in the aggregation-tier service-module intelligence.

24. The data center of claim 23, wherein the IDSM is positioned to monitor incoming traffic from the first data-center tier and server traffic from the third data center tier.

25. The data center of claim 24, wherein the incoming traffic and the server traffic traverse one or more virtual local area networks (VLANs) between the first data-center tier and the second data-center tier between the second data center tier and the third data center tier.

26. The data center of claim 23, further comprising a one-arm connection that couples the CSM is to one or more aggregation-tier switches.

27. The data center of claim 1, further comprising access-tier service-module intelligence included in the third data-center tier.

28. The data center of claim 27, wherein the third data-center tier is electronically connected to one or more network devices selected from the group consisting of a server and a network storage device via one or more VLANs so that L3 switches of the third data center tier implement a default gateway for the one or more network devices.

29. The data center of claim 27, further comprising a network analysis module (NAM) included in the service-module intelligence of the third data center tier.

30. The data center of claim 1, further comprising one or more layer-3 (L3) switches included in the third data center tier.

31. The data center of claim 30, further comprising one or more virtual local area networks (VLANs) interfacing the one or more L3 switches with one or more network devices selected from the group consisting of a server and a storage device, wherein the third data-center tier includes the one or more VLANs interfacing the one or more L3 switches with one or more network devices.

32. The data center of claim 31, further comprising at least one server selected from the group consisting of a web server, an application server, and a database server, wherein the one or more servers include at least one server selected from the group consisting of the web server, the application server, and the database server.

33. The data center of claim 1, further comprising a first L3 interface, wherein the first data-center tier and the second data-center tier are coupled via the first L3 interface.

34. The data center of claim 33, further comprising a second L3 interface, wherein the second data-center tier and the third data-center tier are coupled via the second L3 interface.

35. The data center of claim 34, further comprising one or more point-to-point links between switches of the second data-center tier and switches of the third data-center tier, wherein the second L3 interface includes one or more point-to-point links between switches of the second data-center tier and switches of the third data-center tier.

36. The data center of claim 1, further comprising one or more partner networks coupled to the data center through the second routed firewall instance between the first data-center tier and the second data-center tier.

37. A method comprising:
   constructing a first data-center tier for electronically connecting to an external network and an internal portion of a data center, wherein the internal portion comprises:
      a second data-center tier comprising a second data-center tier internal core and an intrusion detection service module; and
      a third data-center tier comprising a third data-center tier internal core; and
   implementing a first routed firewall instance to interface the first data-center tier and the external network; and
   implementing a second routed firewall instance to interface the first data-center tier and the second data-center tier, wherein the second routed firewall instance facilitates data filtering and routing data between a plurality of virtual local area networks (VLANs) that are internal to the first data-center tier and a VLAN that interfaces the first data-center tier and the second data-center tier, and wherein the intrusion detection service module is electronically connected to the second routed firewall instance, the second data-center tier internal core, and the third data-center tier internal core.

38. A data center comprising:
a first data-center tier for electronically connecting to an external network and an internal portion of a data center, wherein the internal portion comprises:
  a second data-center tier comprising a second data-center tier internal core and an intrusion detection service module; and
  a third data-center tier comprising an third data-center tier internal core;
a first routed firewall instance to interface the first data-center tier and the external network; and
  means for implementing a second routed firewall instance to interface the first data-center tier and the second data-center tier, wherein the second routed firewall instance facilitates data filtering and routing data between a plurality of virtual local area networks (VLANs) that are internal to the first data-center tier and a VLAN that interfaces the first data-center tier and the second data-center tier, and wherein the intrusion detection service module is electronically connected to the second routed firewall instance, the second data-center tier internal core, and the third data-center tier internal core.

39. The data center of claim 38 further comprising a first L3 interface,
  wherein the first data-center tier and the second data-center tier are coupled via the first L3 interface.

40. The data center of claim 1, wherein the intrusion detection module is configured to:
  receive a data stream;
  examine the data stream to determine a security risk from the data stream; and
  based upon determining the security risk, send a notice to a user interface that the data stream comprises the security risk.

41. The data center of claim 1, wherein the electrical connection of the intrusion detection service module is directly connected to each of the second routed firewall instance, the second data-center tier internal core, and the third data-center tier internal core.

42. The data center of claim 1, wherein the electrical connection of the intrusion detection service module is directly connected to the second data-center tier internal core and the third data-center tier internal core.

* * * * *